(12) United States Patent
Baraniuk et al.

(10) Patent No.: US 8,848,091 B2
(45) Date of Patent: Sep. 30, 2014

(54) METHOD AND APPARATUS FOR COMPRESSIVE IMAGING DEVICE

(75) Inventors: Richard g. Baraniuk, Houston, TX (US); Dror Z. Baron, Cary, NC (US); Marco F. Duarte, Durham, NC (US); Kevin F. Kelly, Houston, TX (US); Courtney C. Lane, Ventura, CA (US); Jason N. Laska, Houston, TX (US); Dharmpal Takhar, Houston, TX (US); Michael B. Wakin, Castle Rock, CO (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 13/462,212

(22) Filed: May 2, 2012

(65) Prior Publication Data

US 2012/0213270 A1    Aug. 23, 2012

Related U.S. Application Data

(63) Continuation of application No. 12/791,171, filed on Jun. 1, 2010, now Pat. No. 8,199,244, which is a continuation of application No. 11/379,688, filed on Apr. 21, 2006, now abandoned.

(60) Provisional application No. 60/673,364, filed on Apr. 21, 2005, provisional application No. 60/679,237, filed on May 10, 2005, provisional application No. 60/729,983, filed on Oct. 25, 2005, provisional application No. 60/732,374, filed on Nov. 1, 2005, provisional application No. 60/735,616, filed on Nov. 10, 2005, provisional application No. 60/759,394, filed on Jan. 16, 2006.

(51) Int. Cl.
*H04N 5/225* (2006.01)
*H04N 5/335* (2011.01)
*H04N 3/08* (2006.01)
*H04L 25/20* (2006.01)

(52) U.S. Cl.
CPC ............... *H04L 25/20* (2013.01); *H04N 5/335* (2013.01); *H04N 3/08* (2013.01)
USPC .......................................... 348/335; 348/344

(58) Field of Classification Search
USPC ................................... 348/335, 344
See application file for complete search history.

(56) References Cited

U.S. PATENT DOCUMENTS

| 4,894,662 A | 1/1990 | Counselman |
| 5,412,755 A | 5/1995 | Liu |

(Continued)

OTHER PUBLICATIONS

P. Potuluri, "Multiplex Optical Sensors for Reference Structure Tomography and Compressive Spectroscopy," Department of Electrical and Computer Engineering, Duke University (2004)(XP-002590717).

(Continued)

*Primary Examiner* — Anthony J Daniels
(74) *Attorney, Agent, or Firm* — 24IP Law Group; Timothy DeWitt (57) ABSTRACT

A new digital image/video camera that directly acquires random projections of the incident light field without first collecting the pixels/voxels. In one preferred embodiment, the camera employs a digital micromirror array to perform optical calculations of linear projections of an image onto pseudorandom binary patterns. Its hallmarks include the ability to obtain an image with only a single detection element while measuring the image/video fewer times than the number of pixels or voxels—this can significantly reduce the computation required for image/video acquisition/encoding. Since the system features a single photon detector, it can also be adapted to image at wavelengths that are currently impossible with conventional CCD and CMOS imagers.

42 Claims, 7 Drawing Sheets

(56) References Cited

U.S. PATENT DOCUMENTS

| | | | |
|---|---|---|---|
| 5,465,321 | A | 11/1995 | Smyth |
| 5,546,128 | A | 8/1996 | Nakagakiuchi et al. |
| 5,859,427 | A | 1/1999 | Horie et al. |
| 6,273,571 | B1 | 8/2001 | Sharp et al. |
| 6,313,865 | B1 | 11/2001 | Driscoll et al. |
| 6,464,363 | B1 | 10/2002 | Nishioka |
| 6,714,585 | B1 | 3/2004 | Wang et al. |
| 6,819,469 | B1 | 11/2004 | Koba |
| 2002/0101546 | A1 | 8/2002 | Sharp et al. |
| 2004/0001149 | A1 | 1/2004 | Smith |
| 2004/0263989 | A1 | 12/2004 | Cobb et al. |
| 2006/0029279 | A1 | 2/2006 | Donoho |

OTHER PUBLICATIONS

M. Hanf, S. Kurthb, D. Hahna, W. Faustt', S. Heinza, W. Dötzela, T. Gessnera, "Application of micro mirror arrays for Hadamard transform optics," Microwave and Optical Technology 2003, Proceedings of SPIE vol. 5445 (2003).

M.Harwit and N. Sloane, "Hadamard Transform Optics," Bell Telephone Laboratories, Incorporated (1979).

M. Duarte, M. Davenport, D. Takhar, J. Laska, T. Sun, K. Kelly, and R. Baraniuk, "Single-Pixel Imaging via Compressive Sampling," IEEE Signal Processing Magazine, Mar. 2008 pp. 83-91.

Donoho, David L., "Compressed Sensing," Sep. 14, 2004, Stanford University.

E. Candes and T. Tao, Near Optimal Signal Recovery from Random Projections and Universal Encoding Strategies, Caltech and UCLA, (Oct. 2004).

FIG. 1

FIG 2A ideal image  FIG. 2B 205 wavelets  FIG. 2C 409 wavelets

FIG. 2D image on DMD  FIG. 2E 819 meas.  FIG. 2F 1,638 meas.

(a) frame 32    (b) 2D meas    (c) 2D meas    (d) 3D meas
                2D recon       3D recon       3D recon

METHOD AND APPARATUS FOR COMPRESSIVE IMAGING DEVICE

CROSS-REFERENCE TO RELATED APPLICATIONS

The present application is a continuation of U.S. Nonprovisional patent application Ser. No. 12/791,171 filed on Jun. 1, 2010 now U.S. Pat. No. 8,199,244, which is a continuation of U.S. Nonprovisional patent application Ser. No. 11/379,688, filed on Apr. 21, 2006 now abandoned, which claimed the benefit of the filing dates of U.S. Provisional Application Ser. No. 60/673,364 entitled "Method and Apparatus for Optical Image Compression," and filed on Apr. 21, 2005; U.S. Provisional Application Ser. No. 60/679,237 entitled "Method and Apparatus for Reconstructing Data from Multiple Sources," and filed on May 10, 2005; U.S. Provisional Application Ser. No. 60/729,983 entitled "Random Filters for Compressive Sampling and Reconstruction," and filed on Oct. 25, 2005; U.S. Provisional Application Ser. No. 60/732,374 entitled "Method and Apparatus for Compressive Sensing for Analog-to-Information Conversion," and filed on Nov. 1, 2005; U.S. Provisional Application Ser. No. 60/735,616 entitled "Method and Apparatus for Distributed Compressed Sensing," and filed on Nov. 10, 2005; and U.S. Provisional Application Ser. No. 60/759,394 entitled "Sudocodes: Efficient Compressive Sampling Algorithms for Sparse Signals," and filed on Jan. 16, 2006.

The above cross-referenced related applications are hereby incorporated by reference herein in their entirety.

STATEMENT REGARDING FEDERALLY SPONSORED RESEARCH OR DEVELOPMENT

This invention was made with government support under National Science Foundation Grant No. CCF-0431150, Office of Naval Research Grant No. N00014-02-1-0353, and Air Force Office of Scientific Research Grant No. FA9550-04-1-0148. The government has certain rights in the invention.

BACKGROUND OF THE INVENTION

1. Field of the Invention

The invention relates to imaging devices such as cameras, video cameras, microscopes, and other visualization techniques, and more particularly, to the acquisition of images and video using fewer measurements than previous techniques.

2. Brief Description of the Related Art

The large amount of raw data acquired in a conventional digital image or video often necessitates immediate compression in order to store or transmit that data. This compression typically exploits a priori knowledge, such as the fact that an N-pixel image can be well approximated as a sparse linear combination of K<<N wavelets. These appropriate wavelet coefficients can be efficiently computed from the N pixel values and then easily stored or transmitted along with their locations. Similar procedures are applied to videos containing F frames of P pixels each; we let N=FP denote the number of video "voxels".

This process has two major shortcomings. First, acquiring large amounts of raw image or video data (large N) can be expensive, particularly at wavelengths where CMOS or CCD sensing technology is limited. Second, compressing raw data can be computationally demanding, particularly in the case of video. While there may appear to be no way around this procedure of "sample, process, keep the important information, and throw away the rest," a new theory known as Compressive Sensing (CS) has emerged that offers hope for directly acquiring a compressed digital representation of a signal without first sampling that signal. See Candès, E., Romberg, J., Tao, T., "Robust uncertainty principles: Exact signal reconstruction from highly incomplete frequency information," IEEE Trans. Inform. Theory 52 (2006) 489-509; David Donoho, "Compressed sensing," IEEE Transactions on Information Theory, Volume 52, Issue 4, April 2006, Pages: 1289-1306; and Candès, E., Tao, T., "Near optimal signal recovery from random projections and universal encoding strategies," (2004) Preprint.

Traditional methods of conserving power in camera monitoring and surveillance applications have either relied upon scheduling sleeping and awake modes, or supplementary sensors such as infrared motion detectors to decide when to power on the camera. In the former case, scheduled power-off periods could result in missing an important event entirely. In the latter case, we require additional hardware that may be costly or undesirable. Moreover, in both cases the system suffers from a "power-on lag," which delays image or video capture, potentially causing the camera to miss the important event. These problems would be solved by allowing the camera to continuously monitor the scene in a low-power, low-rate mode, and by enabling it to immediately increase its rate when an important or interesting event occurs. This kind of scheme is impossible in the traditional digital camera paradigm, which is an all-or-nothing scheme: either an image/video is captured at full rate, or no image/video is captured at all. Thus a camera that can continuously monitor at low-rate and increase to full rate with no lag-time is not found in the art, but is directly enabled by our unique camera architecture.

Other efforts on compressed imaging include Pitsianis, N. P., Brady, D. J., Sun, X.: "Sensor-layer image compression based on the quantized cosine transform," SPIE Visual Information Processing XIV (2005) and Brady, D. J., Feldman, M., Pitsianis, N., Guo, J. P., Portnoy, A., Fiddy, M., "Compressive optical MONTAGE photography," SPIE Photonic Devices and Algorithms for Computing VII (2005), which employ optical elements to perform transform coding of multispectral images. The hardware designed for these purposes uses concepts that include optical projections, group testing (see Cormode, G., Muthukrishnan, S., "Towards an algorithmic theory of compressed sensing," DIMACS Tech. Report 2005-40 (2005)), and signal inference. Two notable previous DMD-driven applications involve confocal microscopy (Lane, P. M., Elliott, R. P., MacAulay, C. E., "Confocal microendoscopy with chromatic sectioning," Proc. SPIE. Volume 4959 (2003) 23-26) and micro-optoelectromechanical (MOEM) systems (DeVerse, R. A., Coifman, R. R., Coppi, A. C., Fateley, W. G., Geshwind, F., Hammaker, R. M., Valenti, S., Warner, F. J., "Application of spatial light modulators for new modalities in spectrometry and imaging," Proc. SPIE. Volume 4959 (2003)).

The present invention overcomes shortcomings of the prior approaches. Preferred embodiments of the present invention take fewer measurements than prior techniques, enable significant reduction in the resources (power, computation) required for visualization and use only a small number of physical sensors. The reduction in the size of the hardware associated with preferred embodiments of the invention further may significantly reduce costs of visualization systems. The present invention can also acquire and process streaming video data (time-varying images). Finally, the present inven-

SUMMARY OF THE INVENTION

The present invention uses algorithms and hardware to support a new theory of Compressive Imaging (CI). The approach is based on a new digital image/video camera that directly acquires random projections without first collecting the N pixels/voxels. (See Takhar, D., Laska, J. N., Wakin, M., Duarte, M., Baron, D., Sarvotham, S., Kelly, K. K., Baraniuk, R. G., "A new camera architecture based on optical-domain compression," Proc. IS&T/SPIE Symposium on Electronic Imaging: Computational Imaging. Volume 6065. (2006)). Due to this unique measurement approach, it has the ability to obtain an image with a single detection element while measuring the image far fewer times than the number of pixels/voxels. Note also that additional embodiments using a plurality of detection elements can also be used.

The image can be reconstructed, exactly or approximately, from these random projections by using a model, in essence to find the best or most likely image (in some metric) among all possible images that could have given rise to those same measurements. While several preferred embodiments of reconstruction are described below, it should be understood that additional techniques using or incorporating the present invention can also be used.

A small number of detectors, even a single detector, can be used. Thus, the camera can be adapted to image at wavelengths of electromagnetic radiation that are currently impossible with conventional CCD and CMOS imagers. This feature is particularly advantageous, because in some cases the usage of many detectors is impossible or impractical, whereas the usage of a small number of detectors, or even a single detector, may become feasible using compressive imaging.

A camera in accordance with the present invention can also be used to take streaming measurements of a video signal, which can then be recovered using CS techniques designed for either 2-dimensional (2D) frame-by-frame reconstruction or joint 3D reconstruction. This allows a significant reduction in the computational complexity of the video encoding process.

An imaging system in accordance with the present invention enjoys a number of desirable features:

Potentially single detector or small number of detectors: By time-multiplexing each detector, we can use a less expensive and yet more sensitive photon detectors. This is particularly important when the detector is expensive, making an N-pixel array prohibitive. A single detector camera can also be adapted to image at wavelengths that are currently impossible with conventional CCD and CMOS imagers.

Universality: Random and pseudorandom measurement schemes are universal in the sense that they can be paired with any signal model. Therefore, the same encoding strategy can be applied in a variety of different sensing environments; knowledge of the nuances of the environment is needed only at the reconstruction mechanism (decoder). Random measurements are also future-proof: if future research in image processing yields a better signal model then the same set of random measurements can be used to reconstruct an even better quality image or video.

Encryption: A pseudorandom sequence can be generated using a simple algorithm according to a random seed. Such encoding effectively implements a form of encryption: the randomized measurements will themselves resemble noise and cannot be decoded unless an observer knows the associated seed.

Robustness and progressivity: Random and pseudorandom measurements are robust in the sense that the measurements have equal priority, unlike the Fourier or wavelet coefficients in current transform coders. Thus they allow a progressively better reconstruction of the data as more measurements are obtained; one or more measurements can also be lost without corrupting the entire reconstruction.

Scalability: We can adaptively select how many measurements to compute in order to trade off the amount of compression of the acquired image/video versus acquisition time; in contrast, conventional cameras trade off resolution versus the number of pixel sensors.

Computational asymmetry: compressive imaging (CI) places most of its computational complexity in the decoder, which will often have more substantial computational resources than the encoder/imager. The encoder is very simple; it merely computes incoherent projections and, depending on the specific embodiment, makes few or no decisions.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which:

FIGS. 7A-C show two possible embodiments between the micromirror and photodiode. In FIG. 7B, the protrusions would act as incoherent scatters and should only shift the overall background while the main contribution to the encoded signal on the photodiode comes from the unperturbed mirror pixels. The second, off-center configuration illustrated in FIG. 7C would attempt to increase the contrast ratio by reflecting the light from the mirror into the photodiode at a more oblique angle.

DETAILED DESCRIPTION OF THE PREFERRED EMBODIMENTS

In a first preferred embodiment, a camera architecture of the present invention uses for random measurements a digital micromirror array to spatially modulate an incident image and reflecting the result to a lens, which focuses the light to a single photodiode for measurement. Mathematically, these measurements correspond to inner products of the incident image with a sequence of pseudorandom patterns. For an image model the system assumes sparsity or compressibility; that is, that there exists some basis, frame, or dictionary (possibly unknown at the camera) in which the image has a concise representation. For reconstruction, this system and method uses the above model (sparsity/compressibility) and some recovery algorithm (based on optimization, greedy, iterative, or other algorithms) to find the sparsest or most compressible or most likely image that explains the obtained measurements. The use of sparsity for signal modeling and recovery from incomplete information are the crux of the recent theory of Compressive Sensing (CS), explained below.

Figure 1:
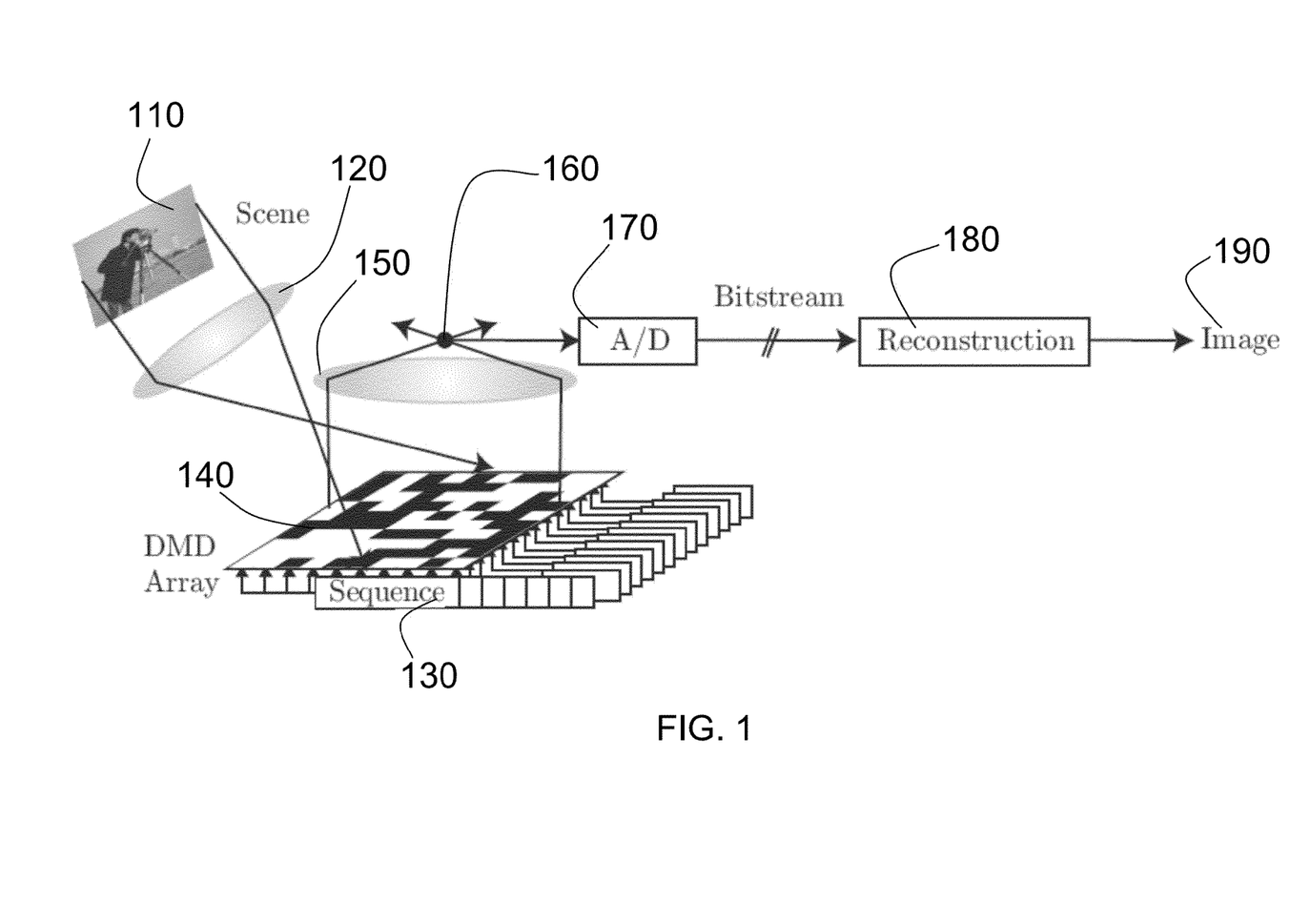
FIG. 1 is a diagram of a compressive imaging camera in accordance with a preferred embodiment of the present invention.

The camera, however, does not have to rely on reflecting light off a digital micromirror device as in FIG. 1. See FIG. 4. The concept is that it can be based on any system that is capable of modulating the incident lightfield x (be it by transmission, reflection, or other means) by some series of patterns $\phi_m$ and then integrating this modulated lightfield at a number of points to compute the inner products $y(m)=<x,\phi_m^T>$ between the light field and the series of patterns (the so-called "incoherent projections" $y=\Phi x$ described below). From these inner products we can recover the original signal (with fewer inner products than the number of pixels we ultimately reconstruct). Examples of systems that can modulate lightfields include digital micromirror devices, LCD shutter arrays (as in an LCD laptop projector), physically moving shutter arrays, any material that can be made more and less transparent to the lightfield of interest at different points in space, etc.

Compressive Sensing

Transform Coding

Compressive Sensing (CS) builds upon a core tenet of signal processing and information theory: that signals, images, and other data often contain some type of structure that enables intelligent representation and processing. Current state-of-the-art compression algorithms employ a decorrelating transform to compact a correlated signal's energy into just a few essential coefficients. Such transform coders exploit the fact that many signals have a sparse representation in terms of some basis $\Psi$, meaning that a small number K of adaptively chosen transform coefficients can be transmitted or stored rather than N signal samples, where K<N. Mathematically, we wish to acquire an N-sample signal/image/video x for which a basis or (tight) frame $\Psi=[\psi_1, \ldots, \psi_N]$ (see S. Mallat, A Wavelet Tour of Signal Processing. San Diego, Calif., USA: Academic Press, 1999) provides a K-sparse representation $$x = \sum_{i=1}^{k} \theta_{n_i} \psi_{n_i},$$

where $\{n_i\}$ are the vector indices, each $n_i$ points to one of the elements of the basis or tight frame, and $\{\theta_i\}$ are the vector coefficients. For example, smooth images are sparse in the Fourier basis, and piecewise smooth images are sparse in a wavelet basis; the commercial coding standards JPEG and JPEG2000 and various video coding methods directly exploit this sparsity (see Secker, A., Taubman, D. S., "Highly scalable video compression with scalable motion coding," IEEE Trans. Image Processing 13 (2004) 1029-1041). For more information on Fourier, wavelet, Gabor, and curvelet bases and frames and wedgelets, see (S. Mallat, A Wavelet Tour of Signal Processing. San Diego, Calif., USA: Academic Press, 1999; E. Candès and D. Donoho, "Curvelets—A Surprisingly Effective Nonadaptive Representation for Objects with Edges," Curves and Surfaces, L. L. Schumaker et al. (eds), Vanderbilt University Press, Nashville, Tenn.; D. Donoho, "Wedgelets: Nearly Minimax Estimation of Edges," Technical Report, Department of Statistics, Stanford University, 1997).

We use the terms "signal" and "image" interchangeably here, since an image is two-dimensional (2D) signal. A video sequence is a sequence of images, or a 3D signal. We use the notations $\phi_m$ and $\phi(m)$ to denote row or column m of a matrix.

The standard procedure for transform coding of sparse signals is to (i) acquire the full N-sample signal x; (ii) compute the complete set $\{\theta(n)\}$ of transform coefficients $\theta(i)=<x, \psi(i)>$, where $(\bullet,\bullet)$ denotes the inner product, $\theta(i)$ denotes the i'th coefficient, and $\psi(i)$ denotes the i'th basis vector (i'th column of the matrix $\Psi$); (iii) locate the K largest, significant coefficients and discard the (many) small coefficients; and (iv) encode the values and locations of the largest coefficients. In cases where N is large and K is small, this procedure is quite inefficient. Much of the output of the analog-to-digital conversion process ends up being discarded (though it is not known a priori which pieces are needed).

This raises a simple question: For a given signal, is it possible to directly estimate the set of large coefficients that will not be discarded by the transform coder? While this seems improbable, the recent theory of Compressive Sensing introduced by Candès, Romberg, and Tao and Donoho referenced above demonstrates that a signal that is K-sparse in one basis (call it the sparsity basis) can be recovered from cK nonadaptive linear projections onto a second basis (call it the measurement basis) that is incoherent with the first, where c is a small overmeasuring constant. While the measurement process is linear, the reconstruction process is decidedly nonlinear.

Incoherent Projections

In CS, we do not measure or encode the K significant $\theta(n)$ directly. Rather, we measure and encode M<N projections $y(m)=<x,\phi_m^T>$ of the signal onto a second set of basis functions, where $\phi_m^T$ denotes the transpose of $\phi_m$. In matrix notation, we measure $$y=\Phi x, \quad (1)$$

where y is an M×1 column vector, and the measurement basis matrix $\Phi$ is M×N with the m'th row the basis vector $\phi_m$. Since M<N, recovery of the signal x from the measurements y is ill-posed in general; however the additional assumption of signal sparsity makes recovery possible and practical. Note that using M<N is the preferred embodiment, but one may also take a larger number of measurements (M=N or M>N).

The CS theory tells us that when certain conditions hold, namely that the basis cannot sparsely represent the elements of the sparsity-inducing basis (a condition known as incoherence of the two bases) and the number of measurements M is large enough, then it is indeed possible to recover the set of large $\{\theta(n)\}$ (and thus the signal x) from a similarly sized set of measurements $\{y(m)\}$. This incoherence property holds for many pairs of bases, including for example, delta spikes and the sine waves of the Fourier basis, or the Fourier basis and wavelets. Significantly, this incoherence also holds with high probability between an arbitrary fixed basis and a randomly generated one (consisting of i.i.d. Gaussian or Bernoulli/Rademacher ±1 vectors). Signals that are sparsely represented in frames or unions of bases can be recovered from incoherent measurements in the same fashion.

We call the rows of $\Phi$ the measurement basis, the columns of $\Psi$ the sparsity basis or sparsity inducing basis, and the columns of $V=\Phi\Psi=[V_1, \ldots, V_N]$ the holographic basis. Note that the CS framework can be extended to frames and more general dictionaries of vectors.

Signal/Image Recovery

The recovery of the sparse set of significant coefficients $\{\theta(n)\}$ can be achieved using optimization or other algorithms by searching for the signal with $l_0$-sparsest coefficients $\{\theta(n)\}$ that agrees with the M observed measurements in y (recall that typically M<N). That is, we solve the optimization problem $$\theta_r = \mathrm{argmin} \|\theta\|_0 \text{ such that } y=\Phi\Psi\theta.$$

The $l_0$ norm $\|\theta\|_0$ counts the nonzero entries in the vector $\theta$; hence it is a measure of the degree of sparsity, with more sparse vectors having smaller $l_0$ norm.

Unfortunately, solving this optimization problem is prohibitively complex and is believed to be NP-hard (see Candès, E., Tao, T., "Error correction via linear programming," (2005) Preprint). The practical revelation that supports the new CS theory is that it is not necessary to solve the $l_1$-minimization problem to recover the set of significant $\{\theta(n)\}$. In fact, a much easier problem yields an equivalent solution (thanks again to the incoherency of the bases); we need only solve for the $l_1$-sparsest coefficients $\theta$ that agree with the measurements y $$\theta_r = \mathrm{argmin} \|\theta\|_1 \text{ such that } y=\Phi\Psi\theta. \quad (2)$$

The optimization problem (2), also known as Basis Pursuit (see Chen, S., Donoho, D., Saunders, M., "Atomic decomposition by basis pursuit," SIAM J. on Sci. Comp. 20 (1998) 33-61), is significantly more approachable and can be solved with traditional linear programming techniques whose computational complexities are polynomial in N. Although only K+1 measurements are required to recover sparse signals via $l_0$ optimization, one typically requires M~cK measurements for Basis Pursuit with an overmeasuring factor c>1.

We use the notation c to describe the overmeasuring/oversampling constant required in various settings and note the following approximation: The constant c satisfies c≈log 2 (1+N/K).

While reconstruction based on linear programming is one preferred embodiment, any reconstruction approach can be used in the present invention. Other examples include the (potentially more efficient) iterative Orthogonal Matching Pursuit (OMP) (see Tropp, J., Gilbert, A. C., "Signal recovery from partial information via orthogonal matching pursuit," (2005) Preprint), matching pursuit (MP) (see Mallat, S. and Zhang, Z., "Matching Pursuit with Time Frequency Dictionaries", (1993) IEEE Trans. Signal Processing 41(12): 3397-3415), tree matching pursuit (TMP) (see Duarte, M. F., Wakin, M. B., Baraniuk, R. G., "Fast reconstruction of piecewise smooth signals from random projections," Proc. SPARS05, Rennes, France (2005)) algorithms, group testing (see Cormode, G., Muthukrishnan, S., "Towards an algorithmic theory of compressed sensing," DIMACS Tech. Report 2005-40 (2005), Sudocodes (see U.S. Provisional Application Ser. No. 60/759,394 entitled "Sudocodes: Efficient Compressive Sampling Algorithms for Sparse Signals," and filed on Jan. 16, 2006), or statistical techniques such as Belief Propagation, (see Pearl, J., "Fusion, propagation, and structuring in belief networks", (1986) Artificial Intelligence, 29(3): 241-288), LASSO (see Tibshirani, R., "Regression shrinkage and selection via the lasso", (1996) J. Royal. Statist. Soc B., 58(1): 267-288), LARS (see Efron, B., Hastie, T., Johnstone, I., Tibshirani, R., "Least Angle Regression", (2004) Ann. Statist. 32(2): 407-499), Basis Pursuit with Denoising (see Chen, X., Donoho, D., Saunders, M., "Atomic Decomposition by Basis Pursuit", (1999), SIAM Journal on Scientific Computing 20(1): 33-61), expectation-maximization (see Dempster, Laird, N., Rubin, D., "Maximum likelihood from incomplete data via the EM algorithm", (1997) Journal of the Royal Statistical Society, Series B, 39(1): 1-38), and so on. These methods have also been shown to perform well on compressible signals, which are not exactly K-sparse but are well approximated by a K-term representation. Such a model is more realistic in practice.

Reconstruction can also be based on other signal models, such as manifolds (see Wakin, M, and Baraniuk, R., "Random Projections of Signal Manifolds" IEEE ICASSP 2006, May 2006, to appear). Manifold models are completely different from sparse or compressible models. Reconstruction algorithms in this case are not necessarily based on sparsity in some basis/frame, yet signals/images can be measured using the systems described here.

The systems described here can also be used to acquire a collection of images or video sequences. Each image or video can be viewed as a point in N-dimensional Euclidean space. Therefore, the collection of images/videos forms a point cloud in N dimensional Euclidean space. Incoherent projections as implemented in our systems will keep different images/videos well-separated and preserve the neighborhood relationships among similar signals, even if we never intend to reconstruct these images/videos (see Dasgupta, S., Gupta, A., "An elementary proof of the Johnson-Lindenstrauss lemma," Tech. Rep. TR-99-006, Berkeley, Calif., 1999). The point cloud approach is useful for posing and solving decision problems with collections of images/videos, such as detection, classification, recognition, tracking, registration, and other problems.

The preferred embodiment is to reconstruct an N-pixel image or video sequence from M<N measurements. Additional embodiments using more measurements are possible. For example, if we use M=N or M>N measurements, then the extra measurements can be used for subsequent processing. For example, additional measurements may be used for averaging or filtering when the image is noisy or corrupted in some way.

Compressive Imaging

The present invention is a new system to support what can be called Compressive Imaging (CI). In one preferred embodiment, the present invention incorporates a microcontrolled mirror array driven by pseudorandom and other measurement bases and a single or multiple photodiode optical sensor. This hardware optically computes incoherent image measurements as dictated by the CS theory; CS reconstruction algorithms are then applied to obtain the acquired images. A camera in accordance with the present invention can also be used to take streaming measurements of a video signal, which can then be recovered using CS techniques designed for either 2D frame-by-frame reconstruction or joint 3D reconstruction. Streaming video can also be supported.

Other desirable features of our system include the use of a single detector (potentially enabling imaging at new wavelengths that are currently impossible or infeasible with CCD and CMOS technology), universal measurement bases (incoherent with arbitrary sparse bases), encrypted measurements (tied to a random seed that can be kept secure), and scalable progressive reconstruction (yielding improved quality with more measurements). (See Takhar, D., Laska, J. N., Wakin, M., Duarte, M., Baron, D., Sarvotham, S., Kelly, K. K., Baraniuk, R. G., "A new camera architecture based on optical-domain compression," Proc. IS&T/SPIE Symposium on Electronic Imaging: Computational Imaging. Volume 6065. (2006).)

Camera Hardware

One possible hardware realization of the CI concept is a single detector camera; it combines a microcontrolled mirror array displaying a time sequence of M pseudorandom basis images with a single optical sensor to compute incoherent image measurements y as in (1) (see FIG. 1). By adaptively selecting how many measurements to compute, the present invention trades off the amount of compression versus acquisition time; in contrast, conventional cameras trade off resolution versus the number of pixel sensors.

FIG. 1 shows a compressive imaging (CI) camera in accordance with a preferred embodiment of the present invention. An incident light field 110 corresponding to the desired image x passes through a lens 120 and is then reflected off a digital micromirror device (DMD) array 140 whose mirror orientations are modulated in the pseudorandom pattern sequence supplied by the random number generator or generators 130. Each different mirror pattern produces a voltage at the single photodiode detector 160 that corresponds to one measurement y(m). While only one photodetector is shown in FIG. 1, any number of detectors may be used, although typically, the number of photodetectors will be less than the total number of ultimate number of pixels obtained in the image. The voltage level is then quantized by an analog-to-digital converter 170. The bitstream produced is then communicated to a reconstruction algorithm 180, which yields the output image 190.

A preferred embodiment of the invention employs a Texas Instruments digital micromirror device (DMD) for generating the random modulation basis patterns. The DMD consists of a 1024×768 array of electrostatically actuated micromirrors where each mirror of the array is suspended above an individual SRAM cell. Each mirror rotates about a hinge and can be positioned in one of two states (+12 degrees and −12 degrees from horizontal); thus light falling on the DMD may be reflected in two directions depending on the orientation of the mirrors. Note that the Texas Instruments DMD is one possible embodiment, but many additional embodiments are possible.

Referring again to FIG. 1, with the help of a biconvex lens 120, the desired image is formed on the DMD plane 140; this image acts as an object for the second biconvex lens 150, which focuses the image onto the photodiode 160. The light is collected from one of the two directions in which it is reflected (e.g., the light reflected by mirrors in the +12 degree state). The light from a given configuration of the DMD mirrors 140 is summed at the photodiode 160 to yield an absolute voltage that yields a coefficient y(m) for that configuration. The output of the photodiode 160 is amplified through an op-amp circuit and then digitized by a 12-bit analog to digital converter 170. These are details of one specific embodiment of the invention. Various additional embodiments are also possible and will be apparent to those of skill in the art.

The photodiode measurements can be interpreted as the inner product of the desired image x with a measurement basis vector $\phi_m$. In particular, letting $\rho(m)$ denote the mirror positions of the m-th measurement pattern, the voltage reading from the photodiode v(m) can be written as $$v(m) \propto <x, \phi_m^T> + DC \text{ offset} \quad (3)$$

where $$\phi_m = 1_{\{\rho(m) = +12 \, degrees\}} \quad (4)$$

and $1_{\{\cdot\}}$ is the indicator function. (The DC offset can be measured by setting all mirrors to −12 degrees; it can then be subtracted off.)

Equation (3) holds the key for implementing a compressive imaging (CI) system. For a given incident lightfield x, we take M measurements {y(1), y(2), . . . , y(M)} corresponding to mirror configurations {$\rho(1), \rho(2), \ldots, \rho(M)$} and thus measurement basis vectors {$\phi_1, \phi_2, \ldots \phi_M$}. Since the patterns $\rho(m)$ are programmable, we can select them to be incoherent with the sparsity-inducing basis (e.g., wavelets, curvelets, etc.). As mentioned previously, random or pseudorandom measurement patterns enjoy a useful universal incoherence property with any fixed basis, and so we employ pseudorandom ±12 degree patterns on the mirrors. These correspond to pseudorandom 0/1 Bernoulli measurement vectors. (The measurements may easily be converted to ±1 Rademacher patterns by setting all mirrors in $\rho(1)$ to +12 degrees and then letting y(m)←2y(m)−y(1) for m>1.) Other options for incoherent CI mirror patterns include −1/0/1 group-testing patterns (see Cormode, G., Muthukrishnan, S.: Towards an algorithmic theory of compressed sensing. DIMACS Tech. Report 2005-40 (2005)). These are specific embodiments of mirror patterns; additional embodiments of mirror patterns can also be used.

Mirrors can also be duty-cycled to give the elements of Φ finer precision, for example to approximate Gaussian measurement vectors (see D. Donoho, "Compressed Sensing," IEEE Transactions on Information Theory, Volume 52, Issue 4, April 2006, Pages: 1289-1306; and Candès, E., Tao, T., "Near optimal signal recovery from random projections and universal encoding strategies," (2004) Preprint). This duty-cycling technique can be used to emulate inner products with any real-valued vector. Specific embodiments may generate each coefficient of such projection vectors using some continuous probability distribution, but any set of real-valued vector values can be used.

This compressive imaging system directly acquires a reduced set of M incoherent projections of an N-pixel image x without first acquiring the N pixel values. Since the camera is "progressive," better quality images (larger K) can be obtained by taking a larger number of measurements M. Also, since the data measured by the camera is "future-proof," new reconstruction algorithms based on better sparsifying image transforms can be applied at a later date to obtain even better quality images.

Streaming Video Acquisition

The CI system and method of the present invention is immediately applicable to video acquisition. As described above, the measurements are taken sequentially in time. Hence, one can view each measurement as a linear projection against a snapshot of the scene at that instant. Viewing the video as a three-dimensional (3D) signal (in which the 2D snapshots are stacked), the measurements vectors {$\phi(m)$} themselves are each localized onto a different 2D snapshot for each m.

In order to recover a video sequence from these measurements, some simplifying assumptions are made. Specifically, traditional CS considers an ensemble of measurements taken from a single signal; in the streaming setting, however, each measurement will act on a different snapshot. The present invention overcomes this problem by assuming that the image changes slowly across a group of snapshots, which can then be equated to a single video frame. The number of snapshots assigned to a frame will be determined by the speed of the acquisition system and the desired temporal resolution of the reconstructed video. Under this assumption, the acquired video is represented as a sequence of F frames, each one measured using M/F measurement vectors that we can group as rows of a matrix $\Phi_i$, i=1, 2, . . . , F. While this is one embodiment that enables to measure a video sequence; additional embodiments, some of which will be described below, are possible and will be apparent to those of skill in the art.

Several options exist for reconstructing the video from these measurements. First, one could reconstruct each frame individually using 2D wavelets, performing a total of F CI reconstructions. Each reconstruction would use the same 2D wavelet sparsity basis $\Psi$ but with a different measurement matrix. This process will be referred to herein as frame-by-frame reconstruction.

Alternative methods more fully exploit the correlation between frames. One solution is to use 3D wavelets as a sparse representation for the video sequence; i.e., to define the joint measurement matrix $$\Phi = \begin{bmatrix} \Phi_1 & 0 & \ldots & 0 \\ 0 & \Phi_2 & \ldots & 0 \\ \vdots & \vdots & \ddots & \vdots \\ 0 & 0 & \ldots & \Phi_F \end{bmatrix}$$

for the video sequence and then perform joint reconstruction of the entire video sequence using a 3D wavelet sparsity basis $\Psi$ for the frame ensemble. Despite its block diagonal structure, the 3D measurement matrix $\Phi$ enjoys sufficient incoherence with the 3D sparsity matrix $\Psi$. The video could also be reconstructed using the manifold-based reconstruction algorithms described above (see Wakin, M, and Baraniuk, R., "Random Projections of Signal Manifolds" IEEE ICASSP 2006, May 2006, to appear).

The compressive imaging architecture and method of the present invention can also be extended to acquire full 3D measurements of a video sequence (that is, where each has 3D support). One embodiment of such 3D measurements would combine inner products sampled at different times, but other embodiments are possible.

Under this setting with full 3D measurements, the entire video sequence is reconstructed using a single measurement matrix $\Phi$ that operates on all of the frames and a suitable 3D sparse basis P such as wavelets. Below, it is demonstrated that such a scheme enjoys better incoherence with the video structure. However, it also increases the complexity of both the measurement and reconstruction processes. Possible solutions to this increased complexity include partitioning the video into blocks, which are then reconstructed separately.

EXAMPLES

Example 1

Still Image Acquisition

Figure 2A:
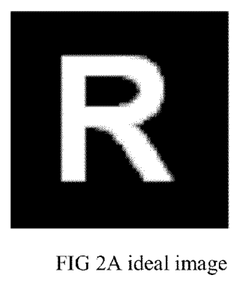
FIGS. 2A-F are diagrams showing the results obtained via various imaging techniques.
Figure 2B:
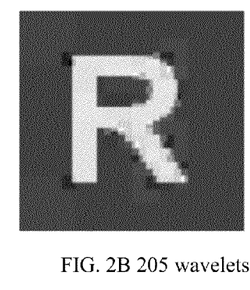
Figure 2C:
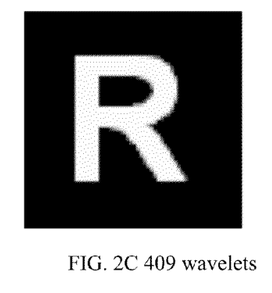
Figure 2D:
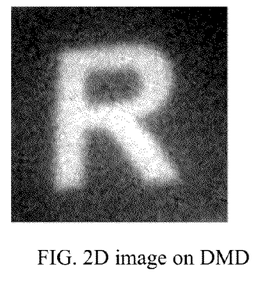
Figure 2E:
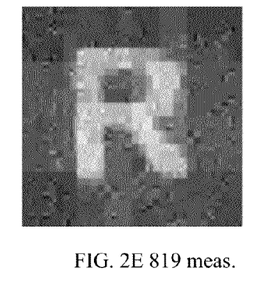
Figure 2F:
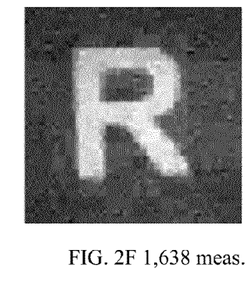

For an imaging experiment, we displayed a printout of the letter "R" in front of the camera; FIG. 2A shows the printout. For acquisition and reconstruction, we use an imaging resolution of N=64×64=4096. Since our test image is piecewise constant (with sharp edges) it can be sparsely represented in the wavelet domain. FIGS. 2B and 2C show the best K-term Haar wavelet approximation of the idealized image in FIG. 2A with K=205 and 409, respectively. Using M=819 and 1,638 measurements (roughly 4× the K used in B and C), we reconstructed the images shown in FIGS. 2E and 2F using the Dantzig Selector (see Candès, E., Tao, T., "The Dantzig selector: Statistical estimation when p is much larger than n," (2005) Preprint), a robust scheme for CS reconstruction. In all cases Haar wavelets were used for approximation or reconstruction. This preliminary embodiment confirms the feasibility of the CI approach; resolution of minor calibration and noise issues will improve the reconstruction quality in future embodiments.

Example 2

Video Simulation

Figure 3:
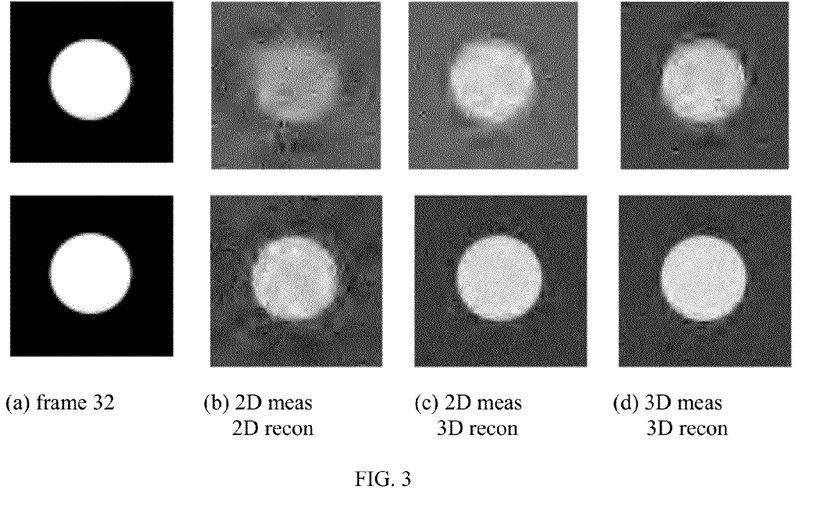
FIG. 3 is a diagram showing frames from a sample video sequence obtained and reconstructed using various techniques

To demonstrate the potential for applications in video encoding, we present a series of simulations for video measurement/reconstruction. Column (a) in FIG. 3 shows a single frame taken from our F=64 frame video sequence that consists of P=64×64 images; in total the video contains N=FP=262,144 3D voxels. The video shows a disk moving from top to bottom and growing from small to large. We measure this video sequence using a total of M measurements, either 2D random measurements (with M/F measurements/frame) or 3D random measurements. (For the 2D measurements, we make the simplifying assumption that the image remains constant across all snapshots within a given frame.) To reconstruct the video from these measurements we compare two approaches: 2D frame-by-frame reconstruction using 2D wavelets as a sparsity-inducing basis and 3D joint reconstruction using 3D wavelets as a sparsity-inducing basis.

FIG. 3 shows Matching Pursuit reconstruction results using M=20,000 (top row) and M=50,000 (bottom row). Comparing columns (b) and (c), we observe that 3D wavelets offer a significant improvement in reconstruction quality over 2D wavelets; we attribute this improvement to the ability of 3D wavelets to capture correlations between frames. Comparing columns (c) and (d), we also observe that full 3D measurements allow better reconstruction than frame-by-frame 2D measurements; we believe this improvement is due to the better incoherency between the measurement basis and the wavelet basis. Fortunately, this improvement is somewhat moderate, which indicates that 2D frame-by-frame measurements (easily obtained from our hardware) may contain sufficient information for high-quality video reconstruction, presuming that a joint 3D technique is used for reconstruction. This embodiment can be extended by developing better joint reconstruction techniques, perhaps by using algorithms for Distributed CS (see Baron, D., Wakin, M. B., Duarte, M. F., Sarvotham, S., Baraniuk, R. G., "Distributed compressed sensing" (2005)) for video reconstruction.

Figure 4:
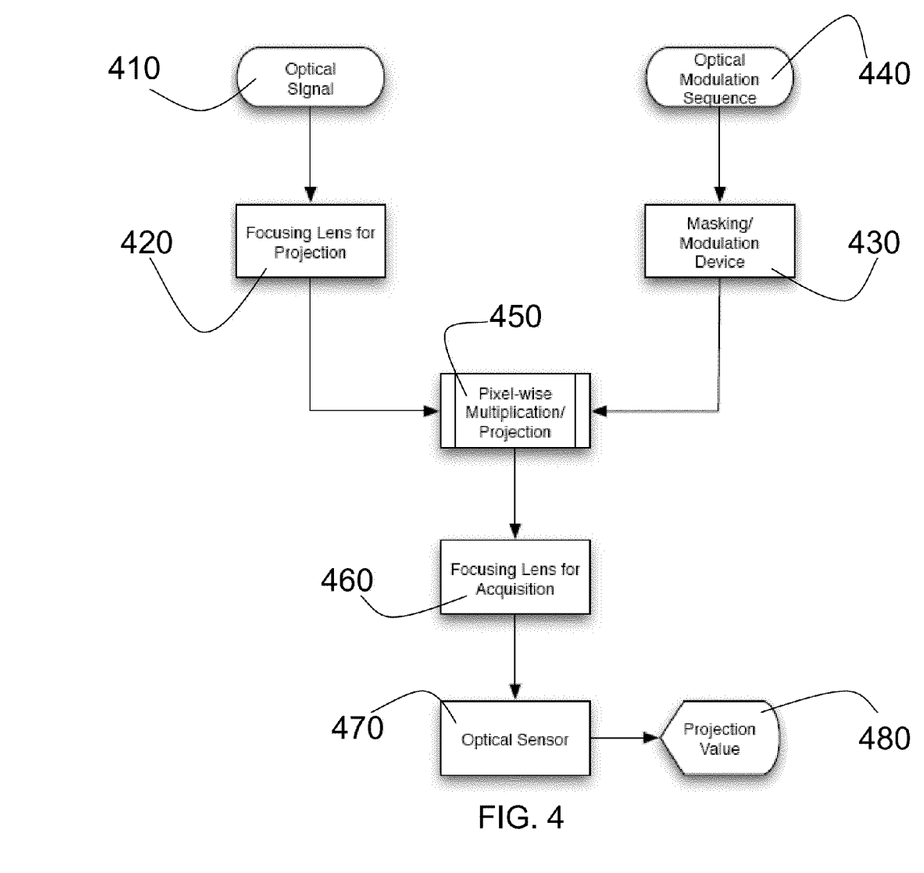
FIG. 4 is a flow diagram showing how a system in accordance with a preferred embodiment of the present invention determines the value of the optical inner product.

As shown in FIG. 4, the optical signal to be acquired 410 runs through the focusing lens 420 which is focused onto the Masking/Modulation Device 430. This device is configured according to the chosen optical modulation sequence 440. The reflection of the image on the device performs a pixel-wise multiplication 450 of the values of the optical signal 410 and the optical modulation sequence 440, and a new optical product signal is obtained. This optical signal is focused by a second lens 460 onto a single optical sensing element 470, which registers the sum of the absolute values of the entries in the product signal, thus returning the value of the inner product 480.

Adaptive Compressive Imaging Scheme

An alternative adaptive compressive imaging scheme embodiment that takes more and more measurements until image/video reconstruction is possible is described.

Figure 5:
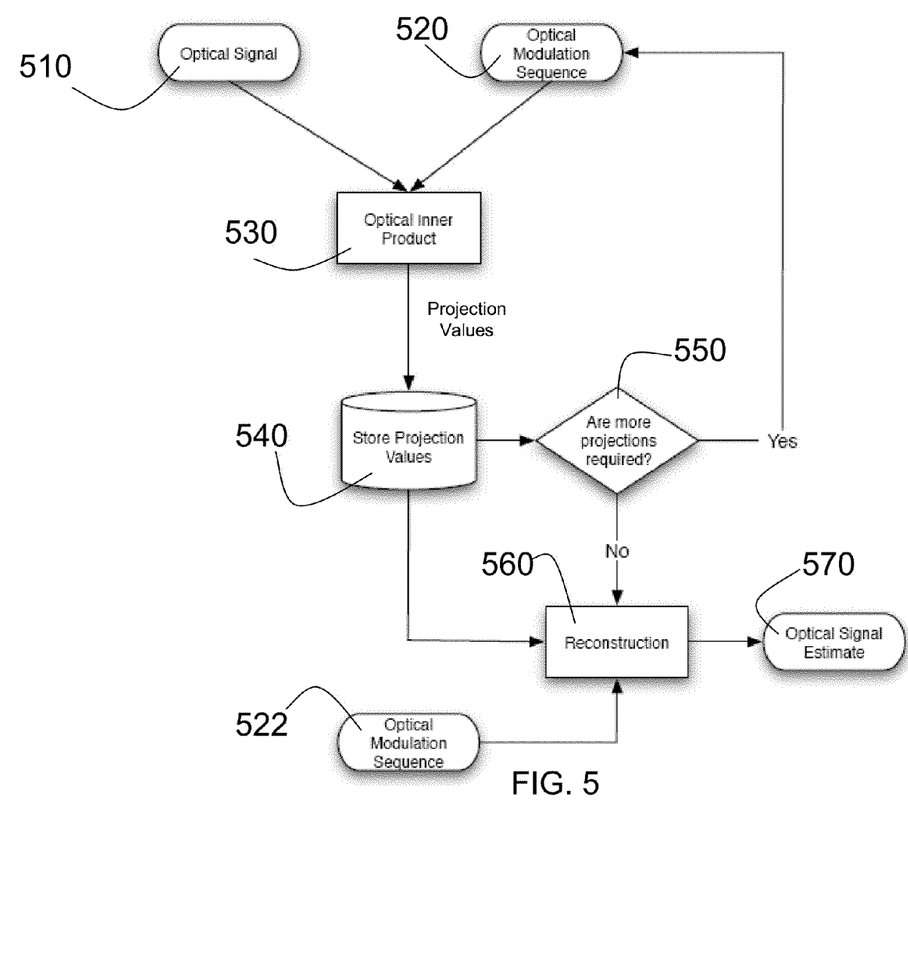
FIG. 5 is a flow diagram showing how a system in accordance with a preferred embodiment of the present invention obtains a reconstruction of an optical signal.

As shown in FIG. 5, the adaptive imaging apparatus takes the optical signal to be acquired 510, and a specified optical modulation sequence 520, and performs an optical inner product of these two signals 530 to obtain a projection value. The projection value is stored 540 and the apparatus checks whether the number of projections necessary for reconstruction has been reached 550. If it has not, then the apparatus employs a new specified optical modulation sequence 522 to obtain new projection values. If it has, then the projection values and the modulation sequences 520 are fed into the reconstruction algorithm 560, which obtains a reconstruction of the optical signal 570. Many possible embodiments for adapting the number of measurements to the specific signal can be used.

Attention Based Processing

One way to save power is to use the camera only when it is needed. Blindly turning the power off except for periodic wakeup intervals is easily accommodated in our design, but this is too crude for many modern sensing applications.

Another approach is to monitor instances of change. For many applications, the received image light field may not change for long periods of time, or the images may change very slowly, allowing a slower data acquisition rate. For example, a camera used to monitor an infrequently used stairwell does not really need to report the same image of the stairwell over and over. However, if a burglar enters the stairwell, then the camera will need to awake abruptly when the scene changes. To conserve the power consumed by the analog-to-digital converter, the computation determining when the camera should wake up should be as simple as possible, using low-power analog processing and/or low-rate digital processing. Essentially, the camera needs a startle reflex: a quick reaction mode involving little overhead or computation.

The CI camera is ideally suited to implement a startle reflex. Simply put, the values or statistics of coefficients at the analog-to-digital converter output, running at a very slow, low-power rate, would be compared with previous values or statistics to determine whether the scene being monitored has changed. Algorithms for achieving this could range from very simple statistical (parametric and non-parametric) tests, for example a test based on an energy detector, a test based on empirical entropies (see Gutman, M., "Asymptotically Optimal Classification for Multiple Tests with Empirically Observed Statistics," IEEE Trans. Inform. Theory 35 (1989) 401-408), or more sophisticated tests based on detailed models of motion. It is also possible that measurement systems other than pseudo-random, ones more adapted to natural images, may give rise to more predictable distributions of values for natural images; thus, any such algorithms could be enhanced by using a carefully designed basis in the analog-to-digital converter. Moreover, rather than simply detecting a change, different bases could be exploited to provide a more detailed analysis of different kinds of change, allowing a richer set of decision rules to control the camera's rate.

A simple embodiment (outlined below) based on the empirical entropy decision rule developed by Gutman (see Gutman above) is described. Experiments have shown that even small changes in images can be detected at an extremely low sampling rate, much lower than would be required to reconstruct the image for viewing. Thus, using only a few (potentially highly quantized) coefficients from the analog-to-digital converter, one can implement an effective startle reflex leading to drastic power savings in applications like monitoring and surveillance. Other statistical tests are also possible beyond the Gutman test.

The startle-reflex algorithm may be described as follows:
1. Collect S samples of a sequential measurement vector y, quantized to B bits per measurement. This is the training sample.
2. Compute the empirical probability distribution of the training sample.
3. Collect the next S samples of y. This is the testing sample.
4. Compute the empirical probability distribution of the testing sample.
5. Compute the empirical entropy test statistic (see Gutman above).
6. If the test statistic exceeds a threshold T, then increase camera to full sampling rate and capture image. Replace training sample with testing sample.
7. Otherwise, form a new training sample by concatenating the old training sample with the testing sample.
8. Repeat steps 2-8.

The startle-reflex algorithm above can be implemented quite simply and demands very little by way of sensing and computation. Yet, it has proven to be highly effective at detecting changes in sequences of images, even at very low measurement rates. For example, typical values of the parameters examined during simulations were: S=30 samples, 6 coefficients in y, and 3 bit (8 level) uniform scalar quantization of each coefficient. These values yielded good performance in many sequences of test images, correctly rejecting up to 50% of the images when no change had occurred These specific values and the startle-reflex algorithm above are specific embodiments of attention based processing. Additional embodiments may use different parameter values and/or test statistic algorithms differing from that of Gutman (see Gutman above).

Attention based processing is not limited to turning a CI camera on and off. Additional embodiments may use the attention information for additional purposes, for example to track different phenomena in space and/or time.

Micromirror Modulation for Imaging

Current imaging devices rely on CCD or CMOS technology for the optical sensing element. While the scale and cost of this technology is continually reducing, the complexity and power requirements have not similarly scaled. Digital micromirror devices have proven to be a commercially viable MEMs technology for the video/projector display market (see D. Doherty and G. Hewlett, "Phased reset timing for improved digital micromirror device (DMD) brightness," in *SID Symposium Digest*, vol. 29, p. 125). Inspired by the success of this technology, a wide range of MEMs structure for the manipulation of optical signals has been produced. In particular, piezoelectically driven membrane mirrors have proven powerful tools for wavefront engineering in laser systems (see C. Radzewicz, P. Wasylczyk, W. Wasilewski, and J. Krasinski, "Piezo-driven deformable mirror for femtosecond pulse shaping," *Optics Letters*, vol. 29, pp. 177-179, January 2004), for adaptive optics in telescopes and microscopes (see B. Frazier, R. Tyson, M. Smith, and J. Roche, "Theory and operation of a robust controller for a compact adaptive optics system," *Optical Engineering*, vol. 43, pp. 2912-2920, December 2004; J. Perreault, T. Bifano, B. Levine, and et al., "Adaptive optic correction using microelectromechanical deformable mirrors," *Optical Engineering*, vol. 41, pp. 561-

566, March 2002; M. Horenstein, S. Pappas, A. Fishov, and et al., "Electrostatic micromirrors for subaperturing in an adaptive optics system," *J. of Electrostatics*, vol. 54, pp. 321-332, March 2002; J. M. G. P. N. March, D. Burns, "Practical implementation of adaptive optics in multiphoton microscopy," *Optics Express*, vol. 11, pp. 112-1130), and for switching in information technology devices (see L. Yoder, W. Duncan, E. Koontz, J. So, T. Bartlett, B. Lee, B. Sawyers, D. Powell, and P. Rancuret, "DLPTM technology: Applications in optical networking," in *Proc. SPIE*, vol. 4457, pp. 54-61, 2001). An embodiment of the present invention exploits the incorporation of a microcontrolled mirror (driven by either piezoelectrics or electrostatics) with an optical sensor so that it can additionally acquire images, instead of adapting current camera technology to be employed as an optical sensor. The material below describes such a preferred embodiment, which is an alternative to the embodiment using DMD arrays described above.

Photodiode Sensing Element:

By replacing the optical sensor array with a single sensing element (in this case a photodiode), we have greatly reduced the complexity. In shifting the complexity of the camera away from the signal receiving portion and into the signal acquisition/interpretation areas, we are able to work with less expensive and more sensitive photon detectors. The advantages of a photodiode sensing element include low-power, low cost, high photon sensitivity that increases with the diode volume, and very fast response times. Modern photodiodes are routinely operated at hundreds of megahertz and have been extended into the GHz regime. The cost of photodiodes can be as little as $0.50 a chip with the cost increasing with the performance capabilities; still, a very good quality photodiode is around $15. In addition, having one optical receiving element allows us to increase the detection efficiency by increasing its size.

Additional applications of this technology occur in the cases where power and cost are not limited. The single photodiode can be replaced with a quadrant photodiode for higher spatial resolution. In specialty applications where greater photon sensitivity may be preferred and cost is not a consideration, the normal photodiode may be replaced with an avalanche photodiode to allow single photon counting. For photodiodes, a variety of semiconductor materials are available, allowing the sensitivity to span the optical, UV, and IR spectrums with equal capabilities. While the initial prototype will be was grayscale, the conversion of this device to a full color camera has been straightforward. For proof of concept we have implemented color imaging in our architecture with RGB filters mounted on a color wheel. However, many other color technologies may also be adapted with our imaging architecture. Our realization of these technologies is due to the broad spectral response of the micromirror and photodiode. Many possible embodiments exist for full-color implementation including a series of prisms to separate the signal between 3 separate photodiodes. In a similar manner we can easily extend the capabilities of our camera for more detailed multispectral or hyperspectral imaging. Any image signal that can be shuttered by an incoherent pattern and then summed at the detector is suitable acquisition and reconstruction by our proposed methods.

Color image/video reconstruction can be facilitated by the fact that the color channels share common information (they are correlated or "jointly sparse"). Therefore, the techniques of distributed compressed sensing could be used to lower the number of measurements required for color data acquisition (see Baron, D., Wakin, M. B., Duarte, M. F., Sarvotham, S., Baraniuk, R. G., "Distributed compressed sensing" (2005).

There are also alternative embodiments of photodiodes, some of which we describe here. Photodiodes can be implemented in a variety of circuit configurations depending on the application. Output voltage could be set up to be proportional to logarithmic change in the detected light level, the external circuit could optimized to emphasize the converting the light signal to frequency, or an x-ray scintillation detector could be mounted in front of the photodiode for medical or astronomy applications (with the appropriate modifications to the mirror coating). These are specific embodiments; additional specific embodiments of photodiodes are possible.

Figure 6:
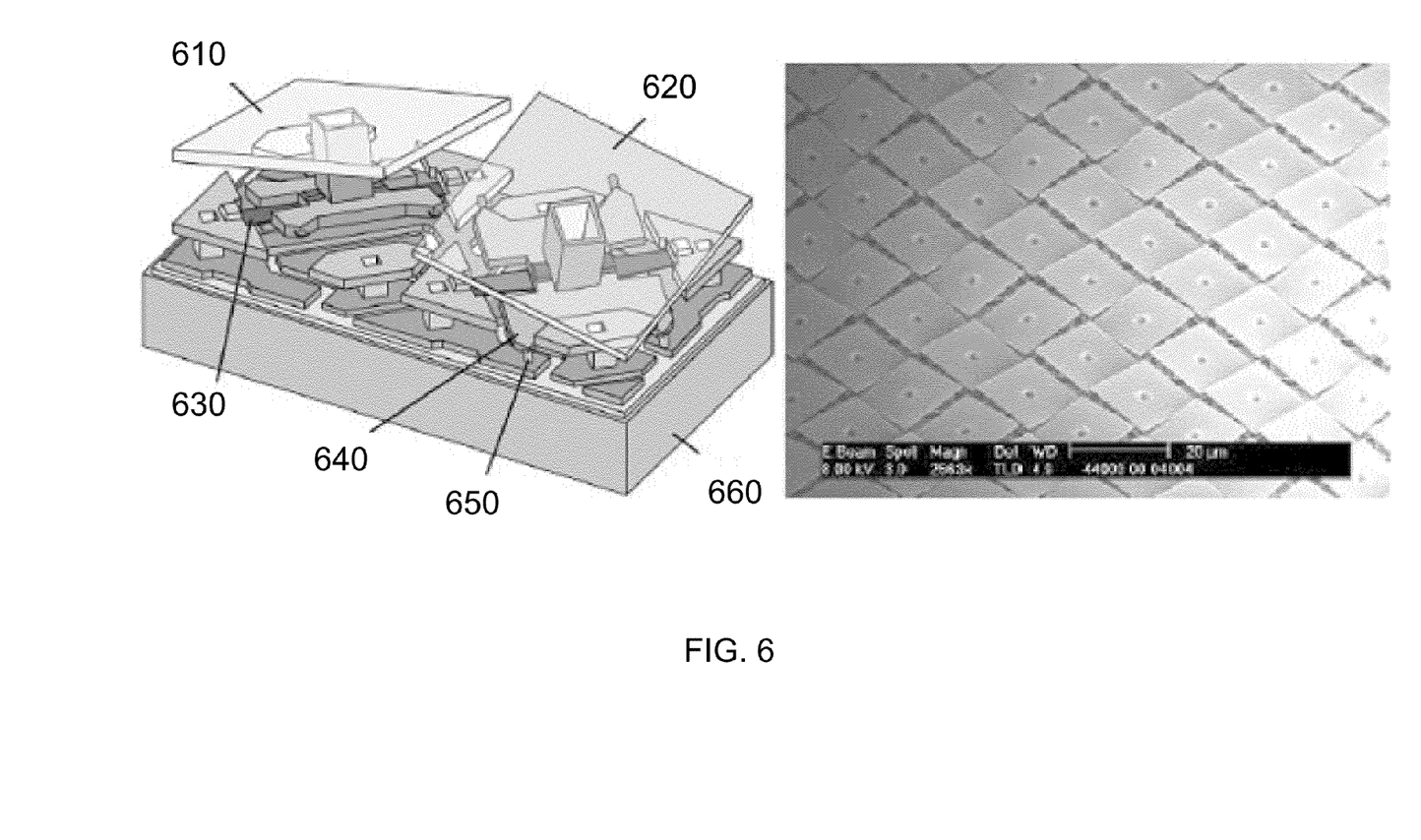
FIG. 6 describes a Texas Instruments digital micromirror device (DMD). The diagram to the left illustrates two mirrors and the mechanism that controls their tilts. A small tilting yoke, address electrodes, torsion hinges, and landing electrodes are created to control the mirror tilts. An array of such mirrors is shown in the diagram on the right.

Digital Micromirror Devices:

The Texas Instruments Digital Micromirror Device (DMD) is composed of an array of electrostatically actuated micromirrors that has found a great deal of success in the projection screen market (see D. Doherty and G. Hewlett, "Phased reset timing for improved digital micromirror device (DMD) brightness," in *SID Symposium Digest*, vol. 29, p. 125; L. Hornbeck, "Current status of the digital micromirror device (DMD) for projection television applications," *International Electron Devices Technical Digest*, p. 1993, 15.1.1; J. Sampsell, "An overview of the digital micromirror device (DMD) and its application to projection displays," in 1993 *SID International Symposium Digest of Technical Papers*, vol. 24, p. 1012, 1993). Each mirror 610, 620 in a two-dimensional (x-y) array of mirrors is suspended above an individual SRAM cell in an x-y array of memory cells on a substrate 660. Electrostatic forces are created between the mirrors and address electrodes connected to the SRAM nodes at which the "1" or "0" voltages appear. These forces twist the mirrors one way or the other about an axis through the torsion hinges 630 until the rotation is stopped at a precise angle determined by one mirror edge or the other touching the underlying substrate. A small tilting yoke 640, springs 650, address electrodes, torsion hinges 630, and landing electrodes are created to control the mirror tilt (this is shown in FIG. 6). A second sacrificial polymer layer is deposited onto this aluminum layer and vias are created from the surface of that layer to the center of each yoke 640. A square mirror is fabricated integral to the post formed by each via. Two sacrificial layers are removed simultaneously, leaving mirrors that tilt as before (as the yokes they ride on are tilted) but that minimize light diffracted from the underlying structure. An array of such mirrors is shown in FIG. 6. This mirror structure has been migrated to the 768×576 pixel DMD, and contrast ratios from both front and rear projection systems based on such mirrors routinely exceed 100:1.

These devices are well above and beyond the necessary requirements of pixel density and contrast ratio for our proposed device. However, any micromirror array, either electrostatically or piezoelectrically driven, is suitable for our camera architecture. Similar driving mechanisms may also be suitable for our camera architecture.

Piezoelectric Deformable Mirror:

As an alternative to electrostatic manipulation in MEMs devices, piezoelectric materials offer a similar ability to convert electrical signals into mechanical work. At the same time, they are able to actuate at much greater frequencies compared to electrostatic based systems. A piezoelectric transducer can reach its nominal displacement in ⅓ of the period of the resonant frequency. Depending of the final size and scale of the tranducers, these frequencies could correspond to a time on the order of microseconds. Electrostatic structures are still favored in MEMs applications due to the ease of the incorporation with traditional IC manufacturing technologies. The overall goal of our micromirror system is not increased miniaturization and its correspondingly greater pixel density, although a commercial version of the DMD based on piezoelectric has been explored (see Y. J. S. K. H. Hwang and S. G. Kim, "Thin-film micromirror array for high-brightness projection displays," *Jpn. J. Appl. Phys.*, vol. 37, pp. 7074-7077, 1998). It is instead a low-fidelity and low-cost acquisition and transmission of the original image.

Figure 7A:
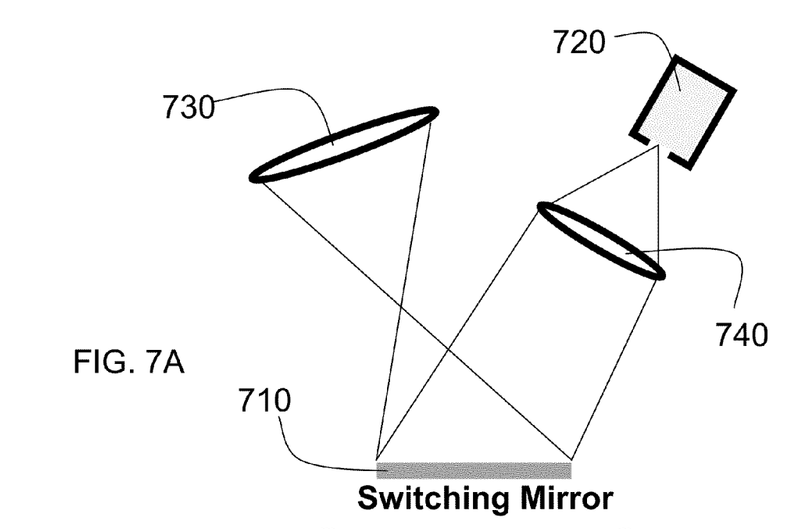

We envision two possible embodiments between the micromirror 710 and photodiode 720 shown in FIG. 7A. These are two specific example embodiments; additional extensions are possible.

Figure 7B:
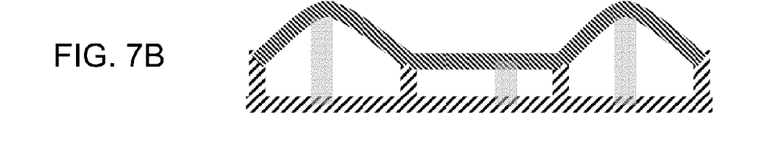

In FIG. 7B, the protrusions in the switching mirror 710 would act as incoherent scatters and should only shift the overall background while the main contribution to the encoded signal on the photodiode comes from the unperturbed mirror pixels. However, the angle of reflection between the lenses 730, 740 and mirror must not be too shallow, otherwise the undeformed neighboring pixels on the mirror might be shadowed by their protruding neighbors. Of course in a second configuration we can exploit this to block the light from the neighboring pixels. This effectively would represent a lateral shift in the white noise basis by one vector.

Figure 7C:
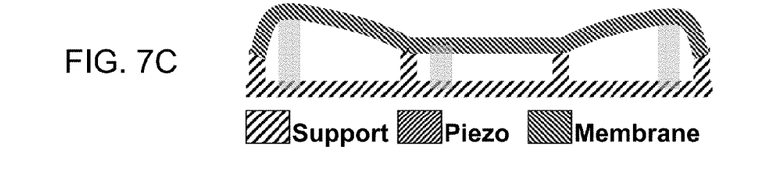

The second, off-center configuration of the switching mirror illustrated in FIG. 7C would attempt to increase the contrast ratio by reflecting the light from the mirror into the photodiode at a more oblique angle. In this instance, the switching mirror bears more of a resemblance to a tunable diffraction grating (see C. W. Wong, Y. Jeon, G. Barbastathis, and S. G. Kim, "Analog tunable gratings driven by thin-film piezoelectric microelectromechanical actuators," *Applied Optics*, vol. 42, pp. 621-626, 2003). After various modeling and testing, the most appropriate device structure will be adopted. As well as physical characterization, we will build upon previously derived models (see G. Vdovin and P. Sarro, "Flexible mirror michromachined in silicon," *Applied Optics*, vol. 34, pp. 2968-2972, June 1995; C. Paterson, I. Munro, and J. C. Dainty, "A low cost adaptive optics system using a membrane mirror," *Optics Express*, vol. 6, pp. 175-185, 2000) for flexible membrane light scattering and apply it to our system using appropriate software and matrix optics. This second configuration represents a modulation of the signal by binary white-noise, similar to the DMD modulation where the former configuration represents modulation by Gaussian white-noise. Recovery of the original image by compressed sensing techniques is valid for both.

Another possible embodiment includes a microcontroller that drives the mirror motions in such a manner that the mirror surface structure forms a time-varying 2D smooth surface. Controlling the mirror structure to conform to the desired smooth surface will enable the mirror angle to vary smoothly between spatially close-by locations on the mirror surface. Therefore, in contrast to the measurement via discretely-computed inner products mentioned before, in this system the device will sense the continuous integral of the optical signal modulated by the mirror surface waveform. This capability will enable advanced analog measurement techniques. This integral can be written as an inner product not between two discrete, length-N vectors but between two continuously varying 2D functions.

Another possible embodiment is to perform image acquisition using real-space convolution with white-noise as a shuttering mechanism and recorded by an individual detector.

Previous embodiments were presented as reflecting light. Additional embodiments can reflect other frequencies and even electron imaging. In another embodiment, an image may be formed using a similar modulation of a (potentially microelectromechanical) shutter array placed directly over the detector. This would create an essentially flat camera. In fact, the modulation mechanism of our image signal in transmission mode would apply well beyond the optical regime allowing for construction of a camera out of a single sensor in regimes where reflective optical elements do not exist, such as gamma rays.

Further Embodiments

Compressive imaging can be incorporated in distributed systems with multiple imaging devices. This will enable reconstruction of multiple images (e.g., multiple frames of a video sequence) using fewer measurements than before, requiring reduced resource consumption (e.g. power reduction). Alternatively, these techniques could enable better image reconstruction quality.

Power reduction can be achieved by minimizing the amount of mirror motion. One way to do this is to specifically design measurement matrices such that adjacent rows are as similar as possible to one another.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for acquiring a compressed representation of an image or a video sequence from an incident light field from inner products, the method comprising the steps of:
   computing inner products between the incident light field and a series of spatial patterns, wherein said computing the inner products comprises:
   (a) modulating the incident light field by the series of spatial patterns with a modulator in order to produce a modulated light field, wherein said modulating comprises applying the spatial patterns to the incident light field successively in time and the series of spatial patterns is configured to maximize similarity overall between successive ones of the spatial patterns;
   (b) optically concentrating the modulated light field to form a concentrated light field having a smaller diameter than a diameter of the modulated light field; and
   (c) obtaining measurements of intensity of the concentrated light field over time using a sensor, wherein the measurements represent the inner products between the incident light field and the series of spatial patterns, wherein the measurements comprise the compressed representation of the image or video sequence.

2. The method according to claim 1, wherein the inner products are usable to reconstruct the image as an array of N pixels, wherein the number of the inner products is less than N.

3. The method according to claim 1, wherein said series of spatial patterns comprises random spatial patterns.

4. The method according to claim 1, further comprising:
   computing an estimate of the image or video sequence by executing a reconstruction algorithm on input data including the inner products and the spatial patterns, wherein the reconstruction algorithm relies on the image or video sequence being at least approximately sparse under a given transformation.

5. The method according to claim 1, wherein the inner products are usable to reconstruct the video sequence as an array of N voxels, wherein the number of the inner products is less than N.

6. The method according to claim 1, wherein the image is approximately sparse with respect to a first basis, wherein the spatial patterns belong to a second basis, wherein the second basis is incoherent with respect to the first basis.

7. The method according to claim 1, wherein the video sequence is approximately sparse with respect to a first basis, wherein the spatial patterns correspond to a second basis that is incoherent with respect to the first basis.

8. A system for acquiring a compressed representation of an image or video sequence from an incident light field, the system comprising:
  means for modulating the incident light field by a series of spatial patterns to produce a modulated light field, wherein said modulating comprises applying the spatial patterns to the incident light field successively in time;
  means for concentrating the modulated light field to form a concentrated light field having a smaller diameter than a diameter of the modulated light field; and
  means for obtaining measurements of intensity of the concentrated light field over time, wherein the measurements represent inner products between the incident light field and the series of spatial patterns, wherein the measurements comprise the compressed representation of the image or video sequences;
  wherein the series of spatial patterns is configured to maximize similarity overall between successive ones of the spatial patterns.

9. The system according to claim 8, wherein said means for obtaining measurements of intensity comprises:
  a single sensing element configured to generate an analog electrical signal representing the intensity of the concentrated light field over time; and
  an analog-to-digital converter configured to obtain the measurements of the intensity of the concentrated light field over time from the analog electrical signal.

10. The system according to claim 9, wherein the measurements are usable to reconstruct the image as an array of N pixels, wherein N is larger than the number of the measurements.

11. The system according to claim 8, wherein said means for obtaining measurements of intensity comprises a plurality of sensing elements.

12. The system according to claim 8, further comprising a means for computing a set of N numeric values based on the inner products, wherein the N numeric values are pixels that represent the image or voxels that represent the video sequence.

13. A device comprising:
  a spatial light modulator configured to modulate an incident light field with a sequence of spatial patterns in order to produce a modulated light field, wherein the spatial light modulator is configured to apply the spatial patterns to the incident light field successively in time, wherein the spatial light modulator includes an array of light modulating elements;
  a pattern generator for supplying the sequence of spatial patterns to said spatial light modulator;
  an optical subsystem configured to concentrate the modulated light field to form a concentrated light field having a smaller diameter than a diameter of the modulated light field;
  a sensor configured to produce an analog electrical signal whose amplitude corresponds to a spatial integral of light in the concentrated light field; and
  an analog-to-digital converter configured to capture samples of the analog electrical signal over time, wherein each of the samples represents an inner product between the incident light field and a corresponding one of the spatial patterns, wherein the samples comprise a compressed representation of a compressible signal, wherein the compressible signal is an image or a video sequences;
  wherein the sequence of spatial patterns is configured to minimize power due to transitions between successive ones of the spatial patterns.

14. The device according to claim 13, wherein said image is a color, multispectral or hyperspectral image.

15. The device according to claim 13, wherein the spatial light modulator comprises an array of mirrors whose orientations are independently controllable.

16. The device according to claim 13, wherein the spatial light modulator comprises an array of light modulating elements, wherein an extent of light transmission through each of the light modulating elements is independently controllable.

17. The device according to claim 13, wherein the spatial light modulator comprises an array of reflective piezoelectric elements whose shapes are independently deformable.

18. The device according to claim 13, further comprising a processor configured to compute an array of N numeric values by executing a sparsity-based reconstruction algorithm on the samples, wherein the N numeric values are pixels that represent said image, wherein the number of the samples is smaller than N.

19. The device according to claim 13, further comprising a processor configured to compute an array of N numeric values by executing a sparsity-based reconstruction algorithm on the samples, wherein the N numeric values are voxels that represent the video sequence, wherein the number of the samples is smaller than N.

20. The imaging device according to claim 13, wherein said video sequence is a color, multispectral or hyperspectral video sequence.

21. The device according to claim 13, wherein the spatial patterns are incoherent relative to a basis in which the compressible signal is approximately sparse.

22. The device according to claim 21, wherein the sequence of spatial patterns is configured to maximize similarity overall between successive ones of the spatial patterns.

23. The device according to claim 13, wherein the spatial patterns are randomly-generated spatial patterns.

24. The device according to claim 13, wherein the spatial patterns correspond to rows of a sparse matrix.

25. The device according to claim 13, wherein the spatial patterns correspond to rows of a matrix, wherein the matrix is a permutation matrix, a parity check matrix or a code matrix.

26. The device according to claim 13, wherein the spatial patterns correspond to rows of a matrix, wherein the elements of the matrix are real valued.

27. The device according to claim 13, further comprising a transmitter configured to transmit the inner products through a channel.

28. The device according to claim 13, wherein the device is battery powered, wherein the device further comprises:
  a processor configured to execute an attention control algorithm, wherein the attention control algorithm operates on the measurements and generates control signals for controlling a sampling rate of the analog-to-digital converter.

29. A system comprising:
- a light modulating device configured to modulate an incident stream of light by a series of spatial patterns to produce a modulated light stream, wherein the light modulating device is configured to apply the spatial patterns to the incident light stream successively in time, wherein the light modulating device includes a plurality light modulating elements;
- a light sensing device having one or more light sensing elements, wherein the one or more light sensing elements are fewer in number than the plurality of the light modulating elements;
- an optical subsystem configured to direct the modulated light stream onto the light sensing elements, wherein the light sensing device is configured to obtain measurements of intensity of the modulated light stream over time, wherein each of the measurements represents an inner product between a corresponding time portion of the incident light stream and a corresponding one of the spatial patterns, wherein the measurements comprise a compressed representation of an image or video sequence, wherein the video sequence is approximately K-sparse, where the number of the measurements is approximately 4K or less.

30. The system according to claim 29, wherein the number of the one or more light sensing elements is small in relation to the number of the light modulating elements of the light modulating device.

31. The system according to claim 29, wherein the light sensing device has exactly one light sensing element.

32. The system according to claim 31, wherein the image is an array of N pixels, wherein the measurements are usable to compute an estimate of the N-pixel array, wherein the number of the measurements is less than N.

33. The system according to claim 29, wherein the image is approximately K-sparse, wherein the number of the measurements is approximately 4K or less.

34. The system according to claim 29, wherein the video sequence is an array of N voxels, wherein the measurements are usable to compute an estimate of the N-voxel array, wherein the number of measurements is less than N.

35. The system according to claim 34, wherein the video sequence is approximately K-sparse, where the number of the measurements is $O(K*\log_2(1+N/K))$ or less.

36. The system according to claim 29, wherein each of the measurements represents a non-adaptive linear projection of the corresponding time portion of the incident light stream onto the corresponding one of the spatial patterns.

37. A method for acquiring a compressed representation of an image from an incident stream of light, the method comprising:
- modulating the incident stream of light by a series of spatial patterns to produce a modulated light stream, wherein said modulating comprises applying the spatial patterns to the incident light stream successively in time, wherein said modulating is performed by a light modulating device;
- directing the modulated light stream onto a light sensing device having one or more light sensing elements, wherein said directing is performed by an optical subsystem;
- obtaining measurements of intensity of the modulated light stream over time, wherein each of the measurements represents an inner product between a corresponding time portion of the incident light stream and a corresponding one of the spatial patterns, wherein the measurements comprise the compressed representation of the image, wherein the number of the one or more light sensing elements is less than a number of pixels in the image, wherein the measurements are usable to compute an estimate of the image, wherein the image is approximately K-sparse, wherein the number of the measurements is approximately 4K or less.

38. A system for acquiring a compressed representation of a video sequence from an incident stream of light, the system comprising:
- a light modulating device configured to modulate the incident stream of light by a series of spatial patterns to produce a modulated light stream, wherein the light modulating device is configured to apply the spatial patterns to the incident light stream successively in time;
- a light sensing device having one or more light sensing elements;
- an optical subsystem configured to direct the modulated light stream onto the one or more light sensing elements, wherein the light sensing device is configured to obtain measurements of intensity of the modulated light stream over time, wherein each of the measurements represents an inner product between a corresponding time portion of the incident light stream and a corresponding one of the spatial patterns, wherein the measurements comprise the compressed representation of the video sequence, wherein the measurements are usable to compute an estimate of the video sequence with n voxels per frame of the video sequence, wherein the number of the one or more light sensing elements is less than n;
- wherein the video sequence is approximately K-sparse, wherein the number of the measurements is approximately 4K or less.

39. The system according to claim 38, wherein the number of the one or more light sensing elements is small in relation to n.

40. The system according to claim 38, wherein the light sensing device has exactly one light sensing element.

41. The system according to claim 38, wherein the number of the measurements is $O(K*\log_2(1+N/K))$ or less, wherein N is the total number of voxels in the video sequence.

42. A method for acquiring a compressed representation of a video sequence from an incident stream of light, the method comprising:
- modulating the incident stream of light by a series of spatial patterns to produce a modulated light stream, wherein said modulating comprises applying the spatial patterns to the incident light stream successively in time, wherein said modulating is performed by a light modulating device;
- directing the modulated light stream onto a light sensing device having one or more light sensing elements, wherein said directing is performed by an optical subsystem;
- obtaining measurements of intensity of the modulated light stream over time, wherein each of the measurements represents an inner product between a corresponding time portion of the incident light stream and a corresponding one of the spatial patterns, wherein the measurements comprise the compressed representation of the video sequence, wherein the measurements are usable to compute an estimate of the video sequence with n voxels per frame of the video sequence, wherein the number of the one or more light sensing elements is less than n, wherein the video sequence is approximately K-sparse, wherein the number of the measurements is approximately 4K or less.

* * * * *